(12) United States Patent
Schedler

(10) Patent No.: US 9,663,300 B2
(45) Date of Patent: May 30, 2017

(54) SYSTEM HAVING A LINK CHAIN

(71) Applicant: SEW-EURODRIVE GMBH & CO. KG, Bruchsal (DE)

(72) Inventor: Dirk Schedler, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 14/888,921

(22) PCT Filed: Mar. 26, 2014

(86) PCT No.: PCT/EP2014/000812
§ 371 (c)(1),
(2) Date: Nov. 3, 2015

(87) PCT Pub. No.: WO2014/180523
PCT Pub. Date: Nov. 13, 2014

(65) Prior Publication Data
US 2016/0083192 A1 Mar. 24, 2016

(30) Foreign Application Priority Data
May 8, 2013 (DE) .......... 10 2013 007 852

(51) Int. Cl.
*B65G 23/18* (2006.01)
*B65G 35/06* (2006.01)

(52) U.S. Cl.
CPC ...... *B65G 35/06* (2013.01); *B65G 2201/0294* (2013.01); *B65G 2812/18* (2013.01)

(58) Field of Classification Search
CPC ......... B65G 54/00; B65G 54/02; B65G 23/18
(Continued)

(56) References Cited

U.S. PATENT DOCUMENTS 3,908,816 A * 9/1975 Brain .............. B65G 15/14
198/626.4
4,800,818 A * 1/1989 Kawaguchi .......... B23Q 7/1436
104/290

(Continued)

FOREIGN PATENT DOCUMENTS

DE       10 224 366      12/2003
DE    10 2005 057 742     6/2007

(Continued)

OTHER PUBLICATIONS

International Preliminary Report on Patentability issued in PCT/EP2014/000812, dated Nov. 10, 2015.
(Continued)

*Primary Examiner* — James R Bidwell
(74) *Attorney, Agent, or Firm* — Andrews Kurth Kenyon LLP

(57) ABSTRACT

A system having a link chain, at least one workpiece support being conveyed by the link chain, a secondary winding situated on, in particular fastened on, the workpiece support supplying an electrical load, the secondary winding being inductively coupled to a primary conductor system, the secondary winding being supplied in particular in contactless fashion, in particular inductively, from the primary conductor system, the link chain resting on and/or being movable on a slide plate, the slide plate resting on first and second support plates, the first support plates being made from a less magnetizable and/or less magnetically and/or electrically conductive material than the second support plates, the first support plates accommodating the primary conductor system, the primary conductor system being in particular situated between a respective first support plate and the link chain and/or slide plate.

22 Claims, 5 Drawing Sheets

(58) Field of Classification Search
    USPC .................................................. 198/805, 841
    See application file for complete search history.

(56) References Cited

U.S. PATENT DOCUMENTS

| | | | | |
|---|---|---|---|---|
| 7,364,622 | B2* | 4/2008 | Hasei | B41J 2/14233 |
| | | | | 118/321 |
| 8,096,409 | B2* | 1/2012 | Wipf | B65G 19/02 |
| | | | | 198/728 |
| 8,210,343 | B2* | 7/2012 | Lykkegaard | H02K 41/031 |
| | | | | 198/805 |
| 2003/0047429 | A1 | 3/2003 | Stewart et al. | |
| 2004/0054435 | A1 | 3/2004 | Dehne et al. | |
| 2014/0183980 | A1* | 7/2014 | Maeda | H02K 5/128 |
| | | | | 310/12.11 |

FOREIGN PATENT DOCUMENTS

| | | |
|---|---|---|
| EP | 1 231 163 | 8/2002 |
| EP | 1 557 378 | 7/2005 |
| EP | 1 411 008 | 11/2006 |

OTHER PUBLICATIONS

International Search Report, dated Jul. 4, 2014, issued in corresponding International Application No. PCT/EP2014/000812.

* cited by examiner

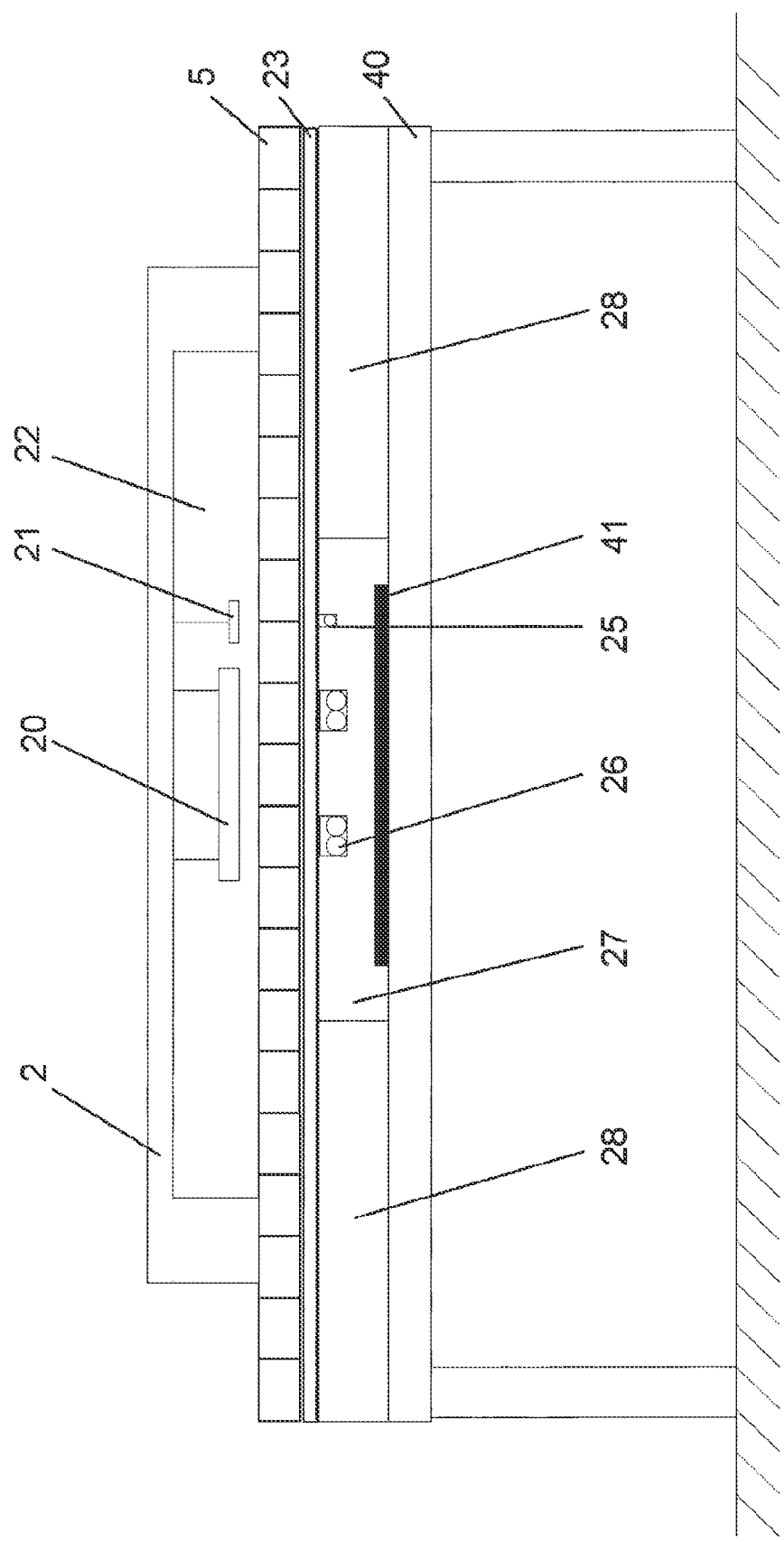

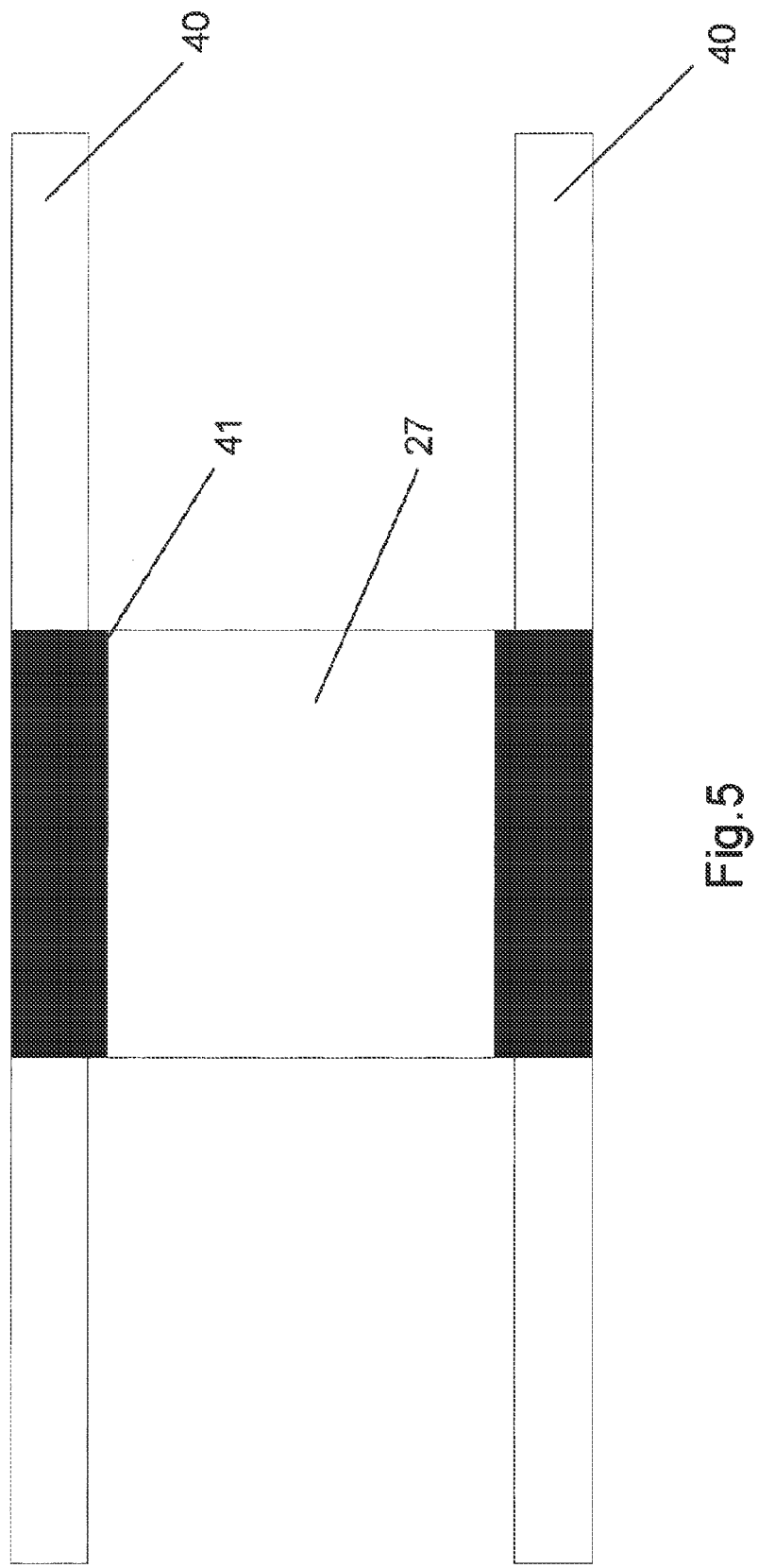

SYSTEM HAVING A LINK CHAIN

FIELD OF THE INVENTION

The present invention relates to a system having a link chain.

BACKGROUND INFORMATION

It is generally known that a link chain can be used as a means of conveyance.

SUMMARY

The present invention is therefore based on the objective of developing a system having a link chain further, it being possible to adjust the working height of a transported workpiece electrically.

Certain features of the present invention in the system having the link chain are that the link chain conveys at least one workpiece support, a secondary winding situated on, in particular fastened on, the workpiece support supplying an electrical load, the secondary winding being inductively coupled to a primary conductor system, the secondary winding being supplied in particular in contactless fashion, in particular inductively, from the primary conductor system, the link chain resting on and/or being movable on a slide plate, the slide plate resting on first and second support plates, the first support plates being made from a less magnetizable and/or less magnetically and/or electrically conductive material than the second support plates, the first support plates accommodating the primary conductor system, the primary conductor system being in particular situated between a respective first support plate and the link chain and/or slide plate.

This is advantageous in that a contactless supply of energy is made possible and thus the working height is electrically adjustable.

In one advantageous development, the primary conductor system is routed in the conveyance direction, in particular as line conductors oriented in parallel to one another. This advantageously allows for a simple routing.

In one advantageous development, the first support plates have grooves, in which the primary conductor system is accommodated. This advantageously again allows for a simple routing.

In one advantageous development, a workpiece is accommodated by the workpiece support. This is advantageous in that the accommodated workpiece is held at the desired working height, the workpiece support being in particular height-adjustable.

In one advantageous development, the electrical load comprises an electric motor, which is in particular designed as a linear actuator and/or which is developed as a lifting drive for adjusting the height of the workpiece, the electric motor in particular driving a scissor-type lifting table of the workpiece support. This advantageously allows for the implementation of a simple height adjustment.

In one advantageous development, the link chain and/or the slide plate is/are made from a magnetically non-conductive material, in particular plastic. This advantageously makes it possible to achieve a low friction.

In one advantageous development, the first support plates are made of plastic and/or wood, in particular so that their load carrying capacity is less than the load carrying capacity of the second support plates. This is advantageous in that the first plates are made of magnetically non-conductive material and that thus there is essentially no influence on the inductive coupling between the secondary winding and the primary conductor system.

In one advantageous development, the second support plates are respectively developed as gratings. This is advantageous in that the second support plates are cost-effective and able to support a load.

In one advantageous development, the first and second support plates rest on beams, in particular T-beams and/or double-T-beams, the beams being designed in particular as cross beams, thus extending in the transverse direction. This advantageously allows for a sturdy construction.

In one advantageous development, the beams respectively have a projection developed so as to be directed away from the primary conductor system, the projection being in particular covered respectively by a first support plate. This offers the advantage of making it possible to reduce eddy current losses.

In one advantageous development, the width of the first support plate in the transverse direction is greater than the corresponding width of the projection. This is advantageous in that the projection is covered and that the primary conductor is held in the area of the projection.

In one advantageous development, the workpiece support has a base frame, whose width in the transverse direction is greater than the width of the first support plate in the transverse direction so that the force of the weight of the workpiece support, particularly including the workpiece, is passed into the respective second support elements via the base frame, the link chain and the slide plate. For this purpose, the tolerance in the transverse direction is taken into account, which arises due to the conveyance of the workpiece support, in particular by way of the roller conveyor. The width of the base frame thus exceeds the width of the first support plate by at least the magnitude of the tolerance. This has the advantage that the force of the weight is passed onto the second support elements.

In one advantageous development, the secondary winding is fastened on cross beams which are fastened on the base frame. This advantageously allows for simple fastening.

In one advantageous development, a leaky-wave conductor is routed in parallel to the line conductors of the primary conductor system, in particular in the conveyance direction. This advantageously allows for data transmission.

In one advantageous development, an antenna is fastened on the workpiece support, in particular on the cross beams fastened on the base frame, for transmitting signals between the leaky-wave conductor and the workpiece support, in particular to the antenna. This advantageously allows for bidirectional data transmission.

Further advantages are derived from the dependent claims. The present invention is not restricted to the feature combination of the claims. A person skilled in the art will discover additional meaningful possibilities for combining claims and/or individual claim features and/or features of the specification and/or of the figures, that arise in particular from the stated objective and/or the objective resulting from a comparison with the related art.

BRIEF DESCRIPTION OF THE DRAWINGS

FIG. 4 shows another exemplary embodiment, where shielding is used in place of the projection.

FIG. 5 shows a top view of the shielding.

DETAILED DESCRIPTION

Figure 1:
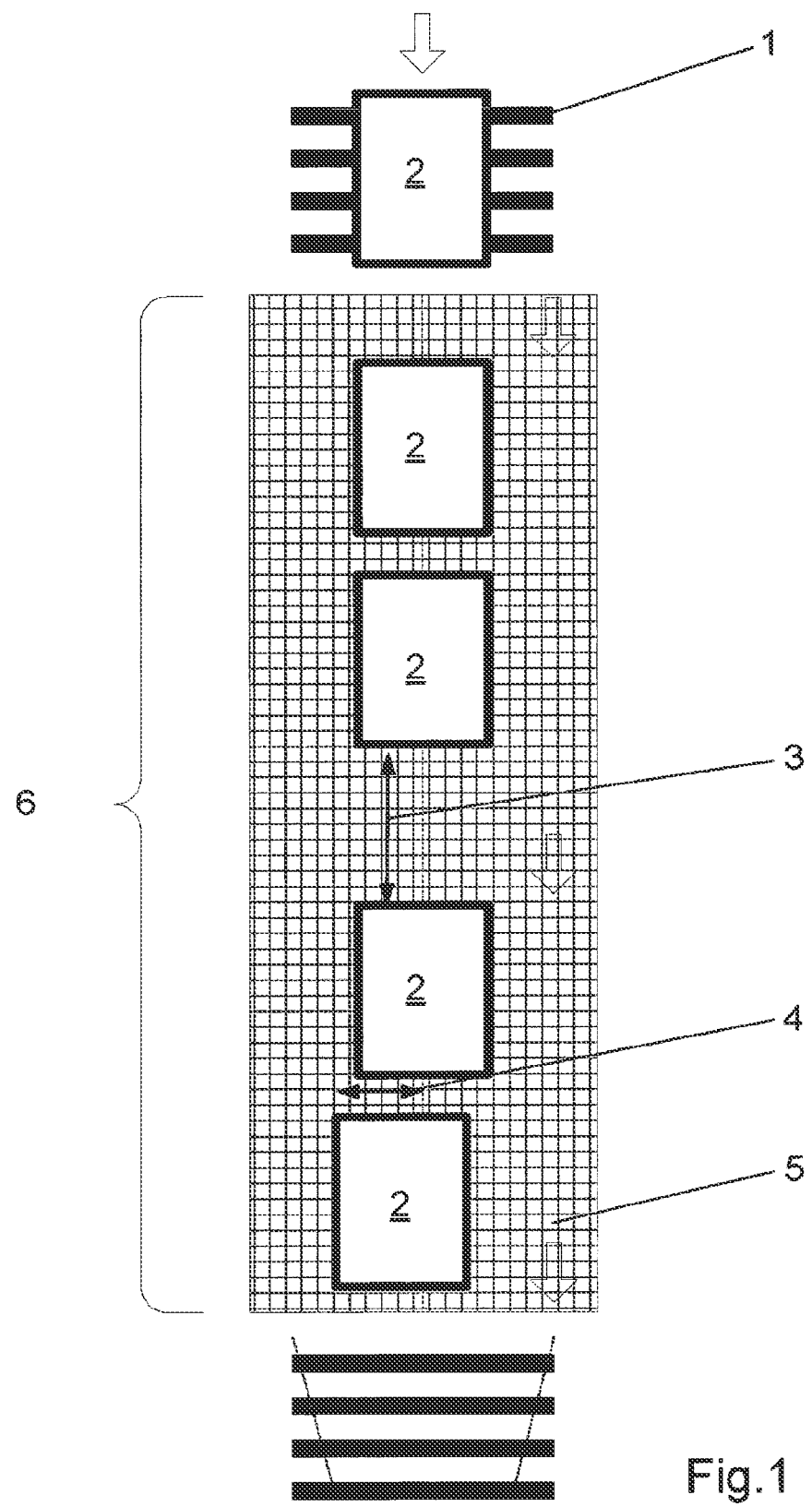
FIG. 1 shows a top view of a system according to the present invention for assembling workpieces, for example for assembling internal combustion engines or automobiles, the workpieces being worked on during assembly on a workpiece support 2, around which a worker is able to move, that is, which is accessible from all four sides.

As shown in FIG. 1, workpiece support 2 is conveyed to a link chain by way of a roller track, that is, a roller conveyor 1.

Link chain 5 slides on a slide plate 23 and in so doing transports workpiece support 2 in the conveyance direction. The respective workpiece support 2 is placed at a tolerance 3 in the conveyance direction and at a tolerance 4 in the transverse direction in relation to workpiece supports 2 succeeding one another in the conveyance direction. The tolerance is determined by the feeding roller conveyor 1.

During the conveyance by way of the link chain, energy and, if indicated, data is/are transferred in contactless fashion to workpiece support 2. This thus occurs in area 6. In this area 6, it is thus possible to supply an electrical load of workpiece support 2 inductively. The load is an electric motor for example, which drives a scissor-type lifting table. For this purpose, workpiece support 2 has a secondary winding 20 on its bottom side, which may be inductively coupled to line conductor 26, which is laid extended in the conveyance direction as the primary conductor. The workpiece situated on workpiece support 2 is thus height-adjustable by way of the scissor-type lifting table. The worker is able to approach the workpiece from all sides and is able to adjust its height. In addition, the worker together with workpiece support 2 and the workpiece situated on it is transported on the link chain in the conveyance direction.

The link chain is made up of a multitude of interconnected link elements and is moved in the conveyance direction on the top side and is moved back in the hidden lower area.

Roller conveyor 1 has rollers whose axles are oriented in the transverse direction. The rollers are respectively developed either as actively driven rollers or as passive, that is, merely bearing-supported, rollers.

A leaky-wave conductor routed in the conveyance direction and an antenna situated on workpiece support 2 allow for a transmission of data between the workpiece support and a stationary unit.

Figure 3:
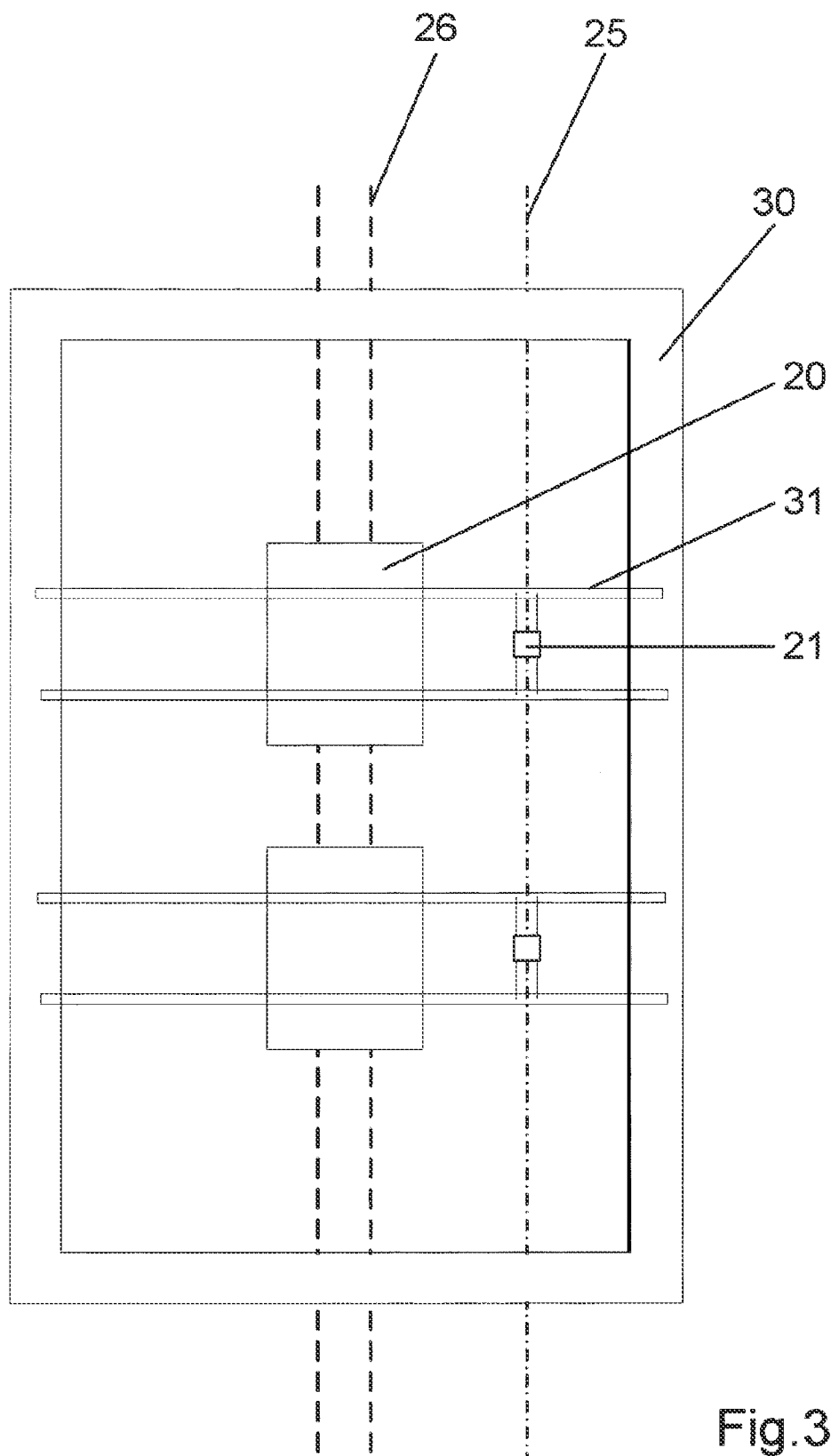
FIG. 3 shows a corresponding schematic view from above onto the area of workpiece support 2.

As shown in FIG. 3, workpiece support 2 has a base frame for spreading the weight and for electromagnetic shielding. The base frame is developed in a rectangular shape.

The base frame transfers the weight of workpiece support 2 to the link chain. Cross beams 31 are fastened in the transverse direction on the lateral sides of base frame 30 extending the conveyance direction, the secondary winding being fastened by its coil brace on cross beams 31. In addition, antenna 21 for near-field transmission is also fastened on cross beams 31.

The primary conductor system is made up of a feed conductor and a return conductor, which are respectively installed as line conductors and which run in parallel. The deviation of secondary winding 20 in the transverse direction corresponds to tolerance 4.

The base frame shields the electromagnetic radiation transmitted between antenna 21 and leaky-wave conductor 25 as well as the magnetic alternating field transmitted for the energy supply.

Because of the width of the base frame, the weight is accordingly widely distributed in the transverse direction.

Figure 2:
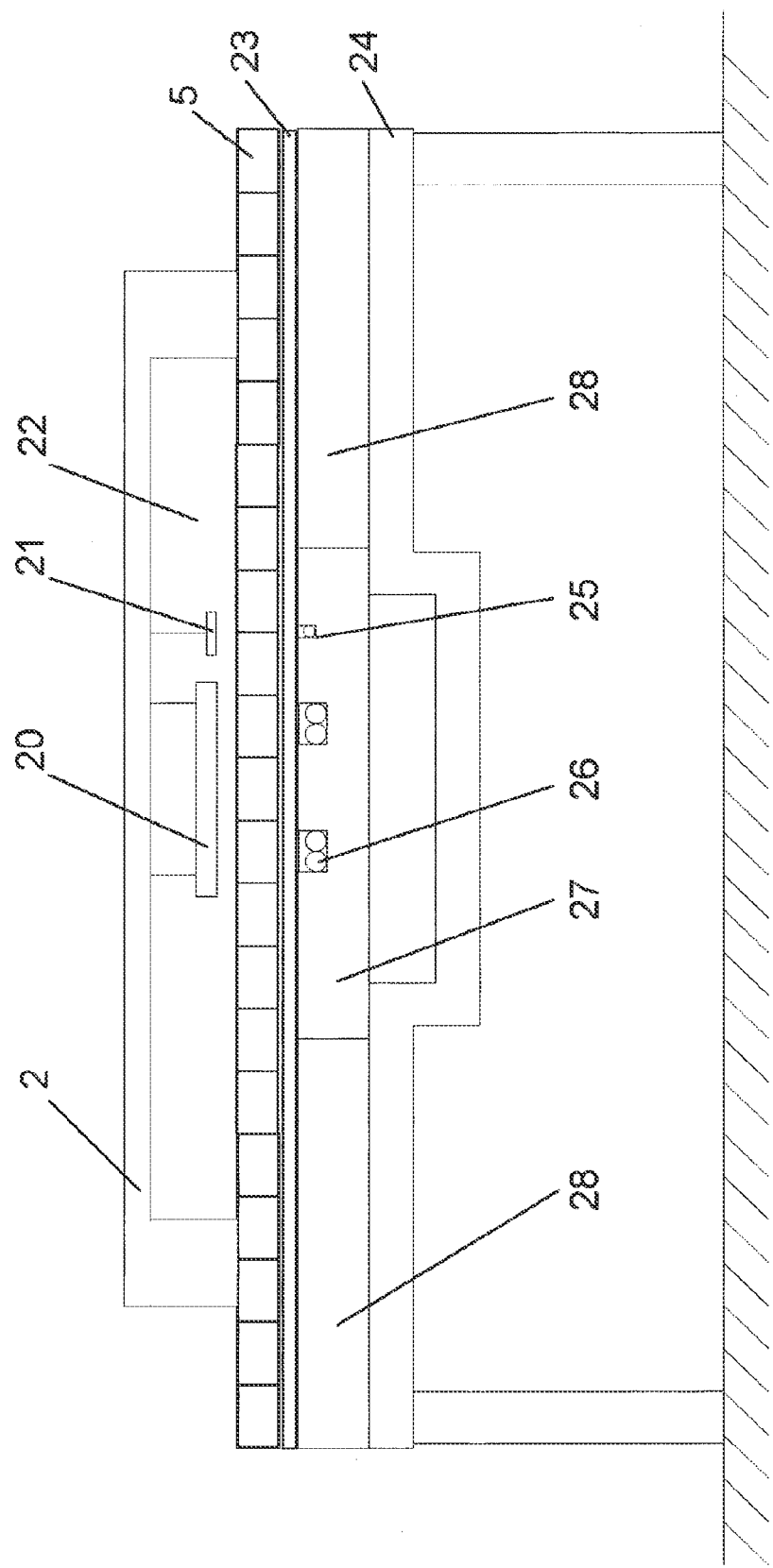
FIG. 2 shows an corresponding cross-sectional view.

As shown in FIG. 2, link chain 5 slides on a slide plate 23, which is preferably made of plastic or of another magnetically and/or electrically non-conductive material.

Slide plate 23 preferably has no recesses and rests on a layer made up of support plates (27, 28). For this purpose, support plates (27, 28) are arranged in respectively the same plane.

Support plates (27) made from electrically and magnetically non-conductive material, in particular from wood or plastic, are arranged centrally with respect to line conductor 26 acting as primary conductor, one after the other in the conveyance direction Adjacent in the transverse direction, metallic support plates 28, in particular a steel grating, are situated. This provides for a high load carrying capacity.

Support plates (27, 28) are supported by beams 24, in particular T-beams, extending in the transverse direction, on which support plates (27, 28) are set. Beams 24 are made of steel and have, in the area of magnetically non-conductive support plates 27, a projection, that is, a projecting section, which is in particular U-shaped and faces away from workpiece support 2. This makes it possible to maintain a minimum distance between line conductor 26 and beam 24.

Line conductor 26 is inserted into a groove of support plate 27, the groove running in the conveyance direction.

The projection thus runs in a downward direction. It is also possible to implement it using technically equivalent means. For example, it may be implemented in C-shaped and/or multi-part fashion.

The projection extends less in the transverse direction than support plate 27 so that the latter rests on beam 24 and covers the projection. In an implementation made of wood or plastic, the groove accommodating line conductor 26 is very simple to produce.

Viewed in the transverse direction, the width of support plates 27 is thus greater than the projection, which in turn covers the primary conductor system in the transverse direction when viewed from below.

The width of base frame 30 in the transverse direction is wider than support plate 27 so that the base frame rests on metallic support plate 28 with its two longer sides of the rectangle, which respectively have a higher load carrying capacity than the respective support plate 27.

Beams 24 in turn rest on a substructure situated in the floor. The substructure is preferably made of steel.

The link chain is made up of chain links, which are respectively connected to their directly adjacent chain links, in particular a swivel joint or at least a form-locking link having rotational play being respectively provided in the area of the connection.

In another exemplary embodiment of the present invention, no projection is provided in beam 24, but rather beam 40 extends in straight fashion, as shown in FIGS. 4 and 5. An aluminum plate 41 is provided between the primary conductor system, that is, line conductors 26 and beam 40, which reduces losses. As shown in FIG. 5, aluminum plate 41 only needs to cover beam 40.

LIST OF REFERENCE NUMERALS 1 roller conveyor, in particular roller track
2 workpiece support, in particular comprising scissor-type lifting table for lifting the workpiece
3 tolerance in the conveyance direction
4 tolerance in the transverse direction
5 link chain, in particular made of plastic
6 conveyor track segment comprising contactless energy and/or data transmission 20 secondary winding
21 antenna for near-field transmission
23 electromagnetically shielded area
24 beam, in particular T-beam, having a projection, that is, a collar section
25 leaky-wave conductor
26 line conductor as primary conductor
27 support plate made of electrically and magnetically non-conductive material, in particular of wood or plastic
28 metallic support plate, in particular grating made of steel
30 base frame of workpiece support 2 for spreading the weight and for electromagnetic shielding
31 cross beam for fastening secondary winding 20 and antenna 21.

The invention claimed is:

1. A system, comprising:
   at least one workpiece support;
   a link chain for conveying the workpiece support;
   a secondary winding situated on the workpiece support and for supplying an electrical load, the secondary winding being inductively coupled to a primary conductor system;
   a slide plate, wherein at least one of: (i) the link chain rests on the slide plate and (ii) the link chain is movable on the slide plate; and
   first and second support plates on which the slide plate rests, wherein:
      the first support plates are made from at least one of a less magnetizable, less magnetically conductive, and less electrically conductive material than the second support plates, and
      the first support plates accommodate the primary conductor system.

2. The system as recited in claim 1, wherein the secondary winding is fastened on the workpiece support.

3. The system as recited in claim 1, wherein the secondary winding is supplied in contactless fashion from the primary conductor system.

4. The system as recited in claim 1, wherein the primary conductor system is situated between a respective first support plate and at least one of the link chain and the slide plate.

5. The system as recited in claim 1, wherein the primary conductor system is routed in the conveyance direction as line conductors oriented in parallel to one another.

6. The system as recited in claim 1, wherein the first support plates have grooves, in which the primary conductor system is accommodated.

7. The system as recited in claim 1, wherein a workpiece is accommodated by the workpiece support.

8. The system as recited in claim 7, wherein the electrical load includes an electric motor that at least one of corresponds to a linear actuator and is developed as a lifting drive to adjust a height of the workpiece.

9. The system as recited in claim 1, wherein at least one of the link chain and the slide plate is made from a magnetically non-conductive material.

10. The system as recited in claim 9, wherein the magnetically non-conductive material includes plastic.

11. The system as recited in claim 1, wherein the first support plates are made of at least one of plastic and wood so that a load carrying capacity of the first support plates is less than a load carrying capacity of the second support plates.

12. The system as recited in claim 1, wherein the second support plates are respectively developed as gratings.

13. The system as recited in claim 1, further comprising a plurality of beams, wherein the first and second support plates rest on the beams.

14. The system as recited in claim 13, wherein the beams include at least one of T-beams and double-T-beams, wherein the beams are cross beams that extend in a transverse direction.

15. The system as recited in claim 13, wherein each of the beams includes a projection directed away from the primary conductor system.

16. The system as recited in claim 15, wherein the projection is respectively covered by at least one of the first support plates.

17. The system as recited in claim 15, wherein a width of at least one of the first support plates in a transverse direction is greater than corresponding width of the projection.

18. The system as recited in claim 1, wherein:
   the workpiece support has a base frame, and
   a width of the base frame in a transverse direction is greater than a width of at least one of the first support plates in the transverse direction so that a weight of the workpiece support is passed into respective second support plates via the base frame, the link chain, and the slide plate.

19. The system as recited in claim 18, wherein the secondary winding is fastened on cross beams that are fastened on the base frame.

20. The system as recited in claim 1, further comprising a leaky-wave conductor routed in parallel to line conductors of the primary conductor system in a conveyance direction.

21. The system as recited in claim 20, further comprising an antenna fastened on the workpiece support and for transmitting a signal between the leaky-wave conductor and the workpiece support.

22. The system as recited in claim 21, wherein the antenna is fastened on cross beams that are fastened on a base frame of the workpiece support.

* * * * *